(12) United States Patent
Kim (10) Patent No.: US 11,449,075 B2
(45) Date of Patent: Sep. 20, 2022

(54) APPARATUS FOR CONTROLLING PLATOONING OF VEHICLE, SYSTEM INCLUDING THE SAME, AND METHOD THEREOF

(71) Applicants: Hyundai Motor Company, Seoul (KR); Kia Motors Corporation, Seoul (KR)

(72) Inventor: Dong Hyuk Kim, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 806 days.

(21) Appl. No.: 16/374,101

(22) Filed: Apr. 3, 2019

(65) Prior Publication Data

US 2020/0183420 A1 Jun. 11, 2020

(30) Foreign Application Priority Data

Dec. 5, 2018 (KR) .......................... 10-2018-0155472

(51) Int. Cl.
*G05D 1/02* (2020.01)
*G08G 1/00* (2006.01)
*G05D 1/00* (2006.01)

(52) U.S. Cl.
CPC ......... *G05D 1/0293* (2013.01); *G05D 1/0088* (2013.01); *G05D 1/0223* (2013.01); *G08G 1/22* (2013.01)

(58) Field of Classification Search
CPC ......... G05D 1/0293; G08G 1/22; H04W 4/46; B60W 2556/65
See application file for complete search history.

(56) References Cited

U.S. PATENT DOCUMENTS

2016/0019782 A1\* 1/2016 Alam .............. B60W 30/18163
340/905
2017/0011633 A1 1/2017 Boegel

\* cited by examiner

*Primary Examiner* — Alan D Hutchinson
*Assistant Examiner* — Andy Schneider
(74) *Attorney, Agent, or Firm* — Slater Matsil, LLP (57) ABSTRACT

An apparatus for controlling platooning of a vehicle includes a processor configured to share platoon line information between platooning groups, determine whether it is necessary to overtake a forward platooning group, calculate an expected time taken to overtake, and adjust and share vehicle speeds of the forward platooning group to be overtaken and a platooning group to overtake, based on the expected time taken to overtake and a storage storing the platoon line information.

20 Claims, 7 Drawing Sheets

APPARATUS FOR CONTROLLING PLATOONING OF VEHICLE, SYSTEM INCLUDING THE SAME, AND METHOD THEREOF

CROSS-REFERENCE TO RELATED APPLICATIONS

This application claims priority to Korean Patent Application No. 10-2018-0155472, filed in the Korean Intellectual Property Office on Dec. 5, 2018, which application is hereby incorporated herein by reference.

TECHNICAL FIELD

The present disclosure relates to an apparatus for controlling platooning of a vehicle, a system including the same.

BACKGROUND

With the advancement of the technologies of intelligent vehicles, platooning technology for grouping several vehicles and performing autonomous driving has been researched. Platooning has been in the spotlight by reducing fuel use according to air resistance as vehicles maintain their platoons, allowing platooning vehicles to travel while maintaining a closer distance between the platooning vehicles than when a driver drives his or her vehicle, and increasing a road utilization rate.

Upon such platooning, it is checked whether a sufficient space is ensured to change a lane. The lane is changed in a manner where the last vehicle first changes a lane and where preceding vehicles in front of the last vehicle perform the lane change to the location in front of the last vehicle.

In the related art, because platooning proceeds without cooperation between platoons when it is necessary overtake a vehicle between platoons, a time to overtake the vehicle is taken excessively. Particularly, as the platoon line is long and as a speed difference between a group to be overtaken and a vehicle to overtake is small, a time taken to overtake may be significantly increased to cause traffic congestion.

SUMMARY

The present disclosure relates to an apparatus for controlling platooning of a vehicle, a system including the same, and a method thereof. Particular embodiments relate to technologies of controlling platooning of a vehicle during platooning.

Embodiments provided in the present disclosure can solve problems occurring in the prior art while advantages achieved by the prior art are maintained intact.

An aspect of the present disclosure provides an apparatus for controlling platooning of a vehicle to minimize a time taken to overtake by temporarily adjusting a platoon line speed and an inter-vehicle distance when vehicle overtaking occurs between platoon lines.

Technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for controlling platooning of a vehicle may include a processor configured to share platoon line information between platooning groups, to determine whether it is necessary to overtake a forward platooning group, calculate an expected time taken to overtake, and to adjust and share vehicle speeds of the forward platooning group to be overtaken and a platooning group to overtake, based on the expected time taken to overtake and a storage storing the platoon line information.

In an embodiment, the processor may be configured to determine that it is necessary to overtake, when the forward platooning group which travels on the same lane is slower in speed than a following platooning group.

In an embodiment, the processor may be configured to calculate the expected time taken to overtake, based on a platoon line distance of the forward platooning group, a platoon line distance of the platooning group to overtake, a platooning speed of the forward platooning group, and a platooning speed of the platooning group to overtake.

In an embodiment, the processor may be configured to control to overtake without changing speeds of the platooning groups, when the expected time taken to overtake is less than a predetermined time.

In an embodiment, the processor may be configured to calculate a relative speed necessary to overtake, based on the expected time taken to overtake.

In an embodiment, the processor may be configured to calculate a speed changed when overtaking the forward platooning group to be overtaken, using a current speed and a decelerable speed of the forward platooning group to be overtaken.

In an embodiment, the processor may be configured to calculate a changed speed of the platooning group to overtake, based on a current speed and a maximal accelerable speed of the platooning group to overtake.

In an embodiment, the processor may be configured to set the sum of the decelerable speed and a maximal accelerable speed of the platooning group to overtake to be the same as the relative speed.

In an embodiment, the processor may be configured to recalculate an expected time taken to overtake, based on the speed changed when overtaking the forward platooning group to be overtaken and a changed speed of the platooning group to overtake.

In an embodiment, the processor may be configured to request the forward platooning group to be overtaken to approve overtaking, when the recalculated expected time taken to overtake is greater than or equal to a predetermined time.

In an embodiment, the processor may be configured to share information about a location predicted to overtake and information about a speed changed when overtaking the forward platooning group to be overtaken with the forward platooning group to be overtaken, when requesting the forward platooning group to be overtaken to approve the overtaking.

In an embodiment, the processor may be configured to determine whether a distance between the forward platooning group to be overtaken and the platooning group to overtake is less than a predetermined distance, when receiving an approval to overtake from the forward platooning group to be overtaken.

In an embodiment, the processor may be configured to change a vehicle speed of the platooning group to overtake to the changed speed of the platooning group to overtake, when the distance between the forward platooning group to be overtaken and the platooning group to overtake is less than the predetermined distance.

In an embodiment, the processor may be configured to request the forward platooning group to be overtaken to adjust a speed of the forward platooning group to be overtaken as the changed speed when overtaking the forward platooning group to be overtaken, after the platooning group to overtake performs a lane change to an adjacent lane for overtaking and control to reduce a distance between the forward platooning group to be overtaken and the platooning group to overtake.

In an embodiment, the processor may be configured to perform return control to overtake from the adjacent lane to a previous lane where the forward platooning group to be overtaken is traveling.

In an embodiment, the processor may be configured to end a vehicle overtaking mode after the return control and return and set the distance between the forward platooning group to be overtaken and the platooning group to overtake and speeds of the forward platooning group to be overtaken and the platooning group to overtake to previous values.

According to another aspect of the present disclosure, a vehicle system may include: an apparatus for controlling platooning of a vehicle configured to share platoon line information between platooning groups, determine whether it is necessary to overtake a forward platooning group, calculate an expected time taken to overtake, and adjust and share vehicle speeds of the forward platooning group to be overtaken and a platooning group to overtake, based on the expected time taken to overtake and a communication module configured to perform vehicle-to-vehicle (V2V) communication between the platooning groups.

According to another aspect of the present disclosure, a method for controlling platooning of a vehicle may include: sharing platoon line information between platooning groups; determining whether it is necessary to overtake a forward platooning group, calculating an expected time taken to overtake, when it is necessary to overtake, and adjusting and sharing vehicle speeds of the forward platooning group to be overtaken and a platooning group to overtake, based on the expected time taken to overtake.

In an embodiment, the calculating of the expected time taken to overtake may include calculating the expected time taken to overtake, based on a platoon line distance of the forward platooning group, a platoon line distance of the platooning group to overtake, a platooning speed of the forward platooning group, and a platooning speed of the platooning group to overtake.

In an embodiment, the adjusting and sharing of the vehicle speed may include calculating a speed changed when overtaking the forward platooning group to be overtaken, using a current speed and a decelerable speed of the forward platooning group to be overtaken and calculating a changed speed of the platooning group to overtake, based on a current speed and a maximal accelerable speed of the platooning group to overtake.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION OF ILLUSTRATIVE EMBODIMENTS

Hereinafter, embodiments of the present disclosure will be described in detail with reference to the accompanying drawings. In adding reference denotations to elements of each drawing, although the same elements are displayed on a different drawing, it should be noted that the same elements have the same denotations. In addition, in describing an embodiment of the present disclosure, if it is determined that a detailed description of related well-known configurations or functions blurs the gist of an embodiment of the present disclosure, it will be omitted.

In describing elements of embodiments of the present disclosure, the terms 1st, 2nd, first, second, A, B, (a), (b), and the like may be used herein. These terms are only used to distinguish one element from another element, but do not limit the corresponding elements irrespective of the nature, turn, or order of the corresponding elements. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

As a platoon line is long and as a speed difference is small, a time taken to overtake is significantly extended to interfere with traffic flow. Thus, an embodiment of the present disclosure may shorten a time taken to overtake by temporarily adjusting a platoon line speed and an inter-vehicle distance using communication between platooning vehicles.

Hereinafter, a description will be given in detail of embodiments of the present disclosure with reference to FIGS. 1 to 5.

Figure 1:
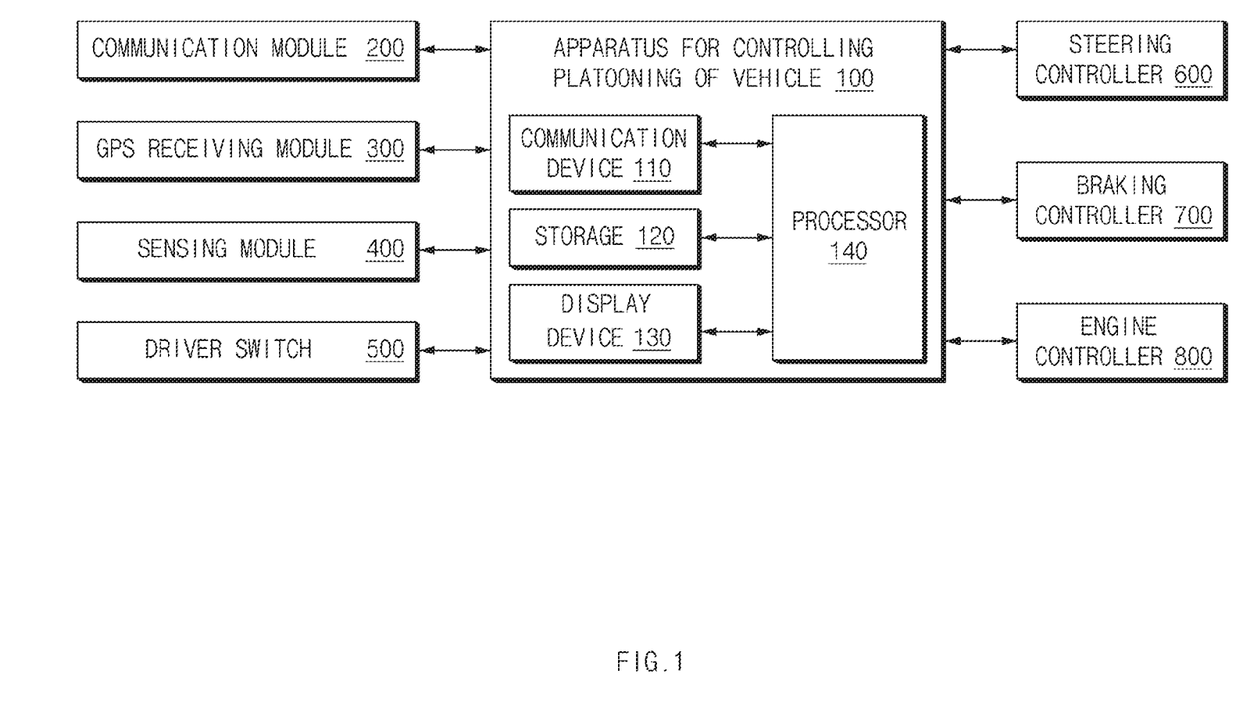
FIG. 1 is a block diagram illustrating a configuration of a vehicle system including an apparatus for controlling platooning of a vehicle according to an embodiment of the present disclosure.
Figure 2:
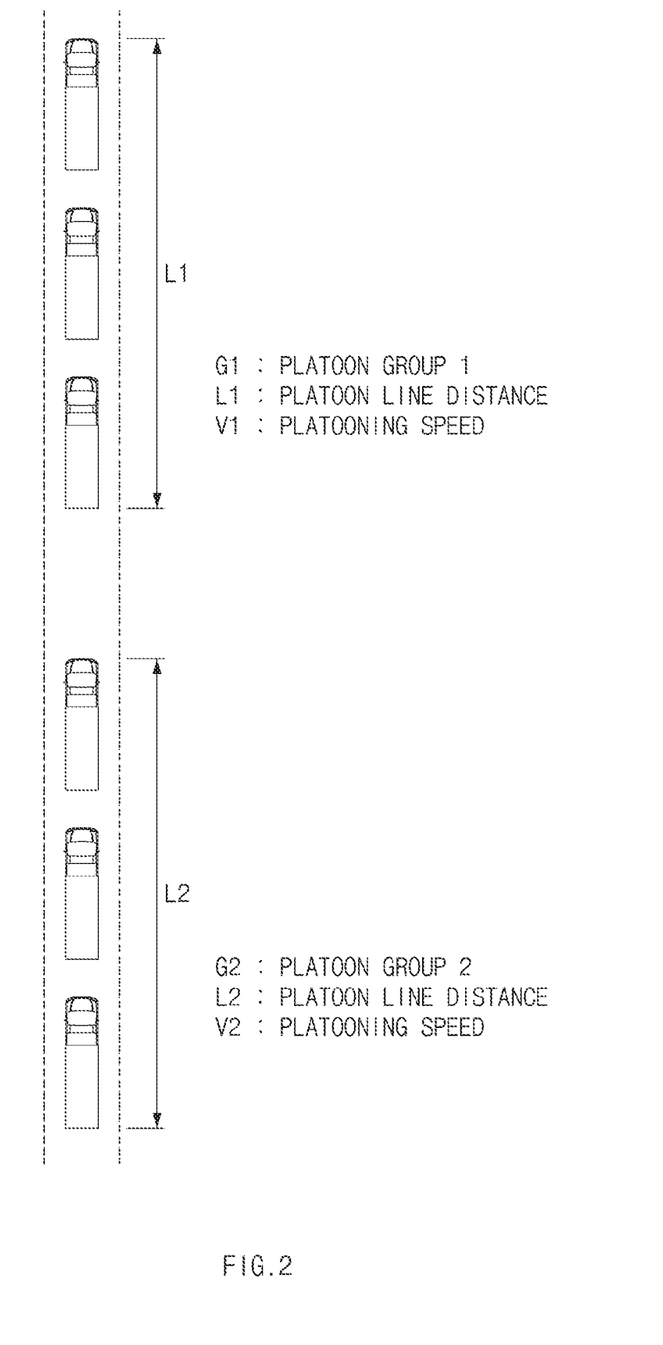
FIG. 2 is a drawing illustrating a state where a plurality of platooning groups perform platooning according to an embodiment of the present disclosure.
Figure 3:
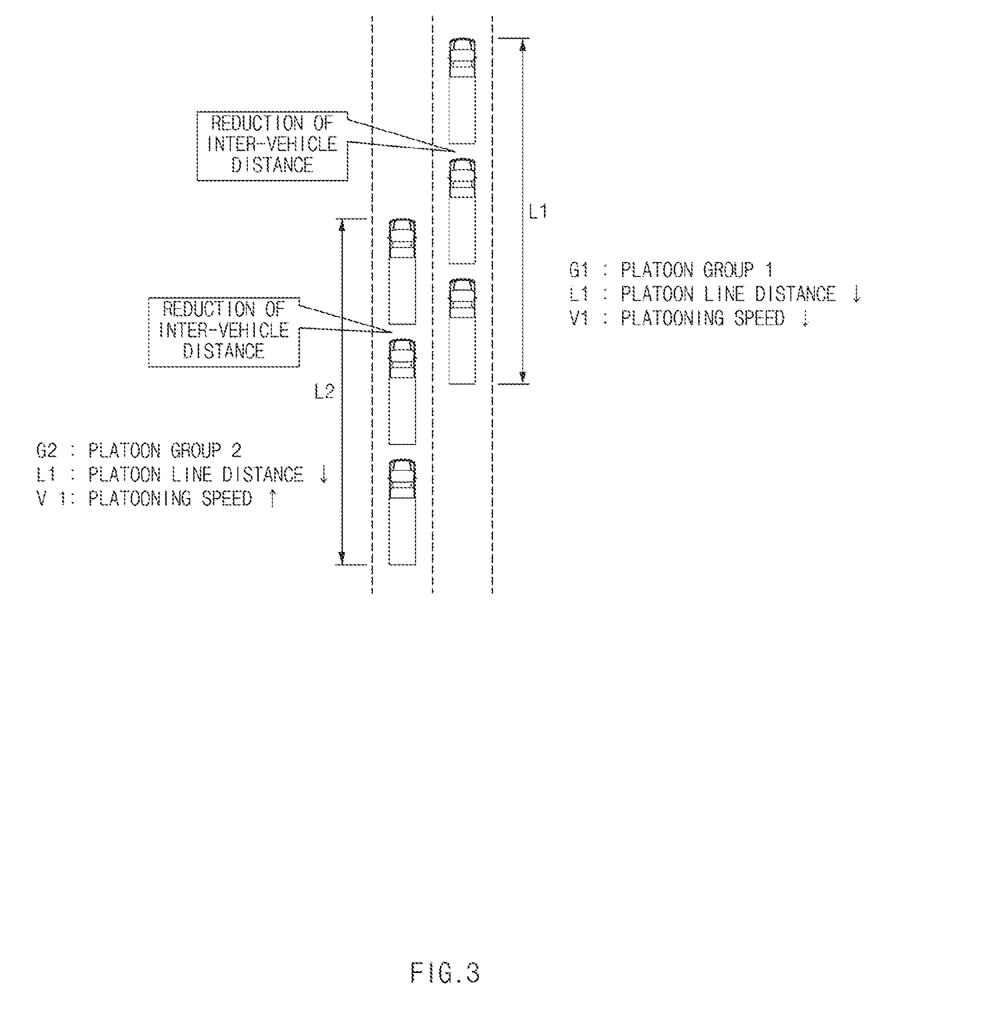
FIG. 3 is a drawing illustrating an overtaking situation between platooning groups according to an embodiment of the present disclosure.

FIG. 1 is a block diagram illustrating a configuration of a vehicle system including an apparatus for controlling platooning of a vehicle according to an embodiment of the present disclosure. FIG. 2 is a drawing illustrating a state where a plurality of platooning groups performs platooning according to an embodiment of the present disclosure. FIG. 3 is a drawing illustrating an overtaking situation between platooning groups according to an embodiment of the present disclosure.

Referring to FIG. 1, the vehicle system according to an embodiment of the present disclosure may include an apparatus wo for controlling platooning of a vehicle, a communication module 200, a global positioning system (GPS) receiving module, a sensing module 400, a driver switch 500, a steering controller 600, a braking controller 700, and an engine controller 800.

The apparatus 100 for controlling the platooning of the vehicle may be loaded into each of vehicles included in a platooning group (a forward platooning group) G1 to be overtaken, shown in FIG. 2, and each of vehicles included in a platooning group G2 to overtake (a following platooning group), shown in FIG. 2. Hereinafter, a description will be given of the apparatus wo for controlling the platooning of the vehicle, loaded into each of the vehicles included in the platooning group G2 to overtake (the following platooning group).

The apparatus 100 for controlling the platooning of the vehicle may share information about a platoon line between platooning groups and may determine whether it is necessary to overtake the forward platooning group G1, thus calculating an expected time taken to overtake. The apparatus 100 for controlling the platooning of the vehicle may adjust and share a vehicle speed of the forward platooning group G1 to be overtaken and a vehicle speed of the platooning group G2 to overtake, based on the expected time taken to overtake.

To this end, the apparatus 100 for controlling the platooning of the vehicle may include a communication device 110, a storage 120, a display device 130, and a processor 140.

The communication device no may be a hardware device implemented with various electronic circuits to transmit and receive a signal over a wireless or wired connection. In an embodiment of the present disclosure, the communication device no may perform inter-vehicle communication through controller area network (CAN) communication, local interconnect network (LIN) communication, or the like and may communicate with the communication module 200, the GPS receiving module 300, the sensing module 400, the drier switch 500, the steering controller 600, the braking controller 700, the engine controller 800, or the like.

The storage 120 may store platooning information (platoon line information) received from another vehicle via the communication module 200, information about a time taken to overtake, calculated by the processor 140, or information about a vehicle speed changed upon overtaking. The storage 120 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, and an optical disk.

The display device 130 may display platooning information during platooning. The display device 130 may display a platooning speed, platooning group overtaking information, or the like. When platooning information is changed, the display device 130 may display the changed information. The display device 130 may be implemented as a head-up display (HUD), a cluster, an audio video navigation (AVN), or the like. Furthermore, the display device 130 may include at least one of a liquid crystal display (LCD), a thin film transistor-LCD (TFT-LCD), a light emitting diode (LED) display, an organic LED (OLED) display, an active matrix OLED (AMOLED) display, a flexible display, a bended display, and a three-dimensional (3D) display. Some thereof may be implemented as transparent displays configured as a transparent type or a semi-transparent type to see the outside. Moreover, the display device 130 may be implemented as a touchscreen including a touch panel to be used as an input device other than an output device.

The processor 140 may be electrically connected with the communication device no, the storage 120, or the display device 130 and may electrically control the respective components. The processor 140 may be an electrical circuit which executes instructions of software and may perform a variety of data processing and calculation described below.

The processor 140 may share information about a platoon line (e.g., information about a driving path, information about a driving speed, information about a platoon line distance, or the like) between platooning groups.

The processor 140 may determine whether it is necessary to overtake the forward platooning group G1, based on information about a platoon line of the forward platooning group G1.

The processor 140 may determine whether the platooning group G2 to overtake (the following platooning group), which travels on the same lane, is faster in speed than the forward platooning group G1 (the platooning group to be overtaken). When the forward platooning group G1 is slower in speed than the following platooning group G2, the processor 140 may determine that it is necessary to overtake.

When the platooning group G2 to overtake is faster in speed than the forward platooning group G1, the processor 140 may calculate an expected time $O_T$ taken to overtake, which is a time taken for the platooning group G2 to overtake to overtake the group G1 to be overtaken.

In this case, the expected time $O_T$ taken to overtake may be calculated as Equation 1 below. For better understanding, the expected time $O_T$ taken to overtake may be calculated with reference to FIG. 2. In FIG. 2, L1 denotes a platoon line distance from a leader vehicle of the platooning group G1 to be overtaken (platoon group 1) to the last following vehicle thereof and V1 denotes a speed of the platooning group G1. In FIG. 2, L2 denotes a platoon line distance from a leader vehicle of the platooning group G2 to overtake (platoon group 2) to the last following vehicle thereof and V2 denotes a speed of the platooning group G2. In this case, it may be seen that the platooning group G1 to be overtaken and the platooning group G2 to overtake travel on the same lane.

$$O_T = \frac{L1 + L2 + 40}{V2 - V1} \qquad \text{[Equation 1]}$$

Herein, $O_T$ denotes the expected time taken to overtake, L1 denotes the platoon line distance of the platooning group G1 to be overtaken, L2 denotes the platoon line distance of the platooning group G2 to overtake, V1 denotes the vehicle speed of the platooning group G1 to be overtaken, and V2 denotes the vehicle speed of the platooning group G2 to overtake. In this case, '40' denotes the minimum margin distance for overtaking.

The processor 140 may calculate a relative speed $V_{RS}$ necessary to overtake.

In other words, when the expected time $O_T$ taken to overtake is less than 20 seconds, the processor 140 may fail to change the speed. When the expected time $O_T$ taken to overtake is greater than or equal to 20 seconds and is less than 30 seconds, the processor 140 may set the relative speed $V_{RS}$ to 10 kph or less. When the expected time $O_T$ taken to overtake is greater than or equal to 30 seconds and is less than 40 seconds, the processor 140 may set the relative speed $V_{RS}$ to 20 kph or less. When the expected time $O_T$ taken to overtake is greater than or equal to 40 seconds and is less than 60 seconds, the processor 140 may set the relative speed $V_{RS}$ to 30 kph or less. When the expected time $O_T$ taken to overtake is greater than 60 seconds, the processor 140 may set the relative speed $V_{RS}$ to 40 kph or less.

The processor 140 may calculate vehicle speeds $V_{2\_NEXT}$ and $V_{1\_NEXT}$ changed upon overtaking as Equation 2 below.

In this case, the processor 140 may calculate the changed vehicle speed in consideration of the truck speed limit 90 km/h.

[platoon group to overtake]

$$V_{2\_NEXT} = V_2 + V_{ACC} (V_{ACC} = \text{MAX accelerable speed})$$

[platooning group to be overtaken]

$$V_{1\_NEXT} = V_1 - V_{DEC} (V_{DEC} = \text{decelerable speed})$$

where $V_{RS} = V_{ACC} + V_{DEC}$ [Equation 2]

The processor 140 may recalculate an expected time taken to overtake, based on the vehicle speeds $V_{2\_NEXT}$ and $V_{1\_NEXT}$ changed upon overtaking. When the expected time $O_T$ taken to overtake is greater than or equal to 20 seconds, the processor 140 may request the platooning group G1 to be overtaken (the forward platooning group) to approve overtaking. In this case, the processor 140 may share information about a location predicted to overtaken and information about a speed changed upon overtaking with the platooning group G1 to be overtaken (the forward platooning group). In other words, the processor 140 may request the platooning group G1 to be overtaken (the forward platooning group) to adjust a driving speed.

When receiving the approval to overtake from the platooning group G1 to be overtaken (the forward platooning group), the processor 140 may determine whether a distance between the platooning group G2 to overtake and the platooning group G1 to be overtaken (the forward platooning group) decreases to less than a predetermined distance. For example, the processor 140 may check whether the distance between the platooning group G2 to overtake and the platooning group G1 to be overtaken (the forward platooning group) decreases to less than 300 m.

When the distance between the platooning group G2 to overtake and the platooning group G1 to be overtaken (the forward platooning group) is less than the predetermined distance, the processor 140 may change the speed V2_NEXT of the platooning group G2 to overtake. In other words, the processor 140 may fail to change a speed of the platooning group G2 to overtake until the platooning group G2 to overtake is close to the platooning group G1 to be overtaken to minimize a time for adjusting the speed of the platooning group G1 to be overtaken.

The processor 140 may perform a lane change to an adjacent lane to overtake at the changed speed V2_NEXT. When the lane change is completed, as shown in FIG. 3 the processor 140 may minimize an inter-vehicle distance in the platooning group G2 to overtake and may request the platooning group G1 to be overtaken to cooperate. In other words, the processor 140 may transmit information associated with reduction of a line distance and a cooperative speed to the platooning group G1 to be overtaken. For example, the processor 140 may decrease a time gap from 0.5 seconds to 0.4 seconds to minimize an inter-vehicle distance in the platooning group G2. Furthermore, the processor 140 may transmit information about the changed vehicle speed V1_NEXT and the changed time gap (from 0.5 seconds to 0.4 seconds) to the platooning group G1 to be overtaken to request the platooning group G1 to cooperate. In other words, the processor 140 may reduce an inter-vehicle distance in both the platooning group G1 to be overtaken and the platooning group G2 to overtake.

The processor 140 may perform return control such that the platooning group G2 to overtake overtakes from an adjacent lane to a previous lane where the platooning group G1 to be overtaken is traveling. When the lane returning to the original lane is completed, the processor 140 may end the vehicle overtaking mode. In this case, the processor 140 may return the inter-distance in the platooning group G1 to be overtaken and the platooning group G2 to overtake (return the time gap from 0.4 seconds to 0.5 seconds) and may return the vehicle speeds V1_NEXT and V2_NEXT to the original vehicle speeds V1 and V2.

Referring again to FIG. 1, the communication module 200 may perform vehicle-to-vehicle (V2V) communication between platooning groups, between vehicles in a platoon line. The communication module 200 may perform vehicle-to-infrastructure (V2I) communication as well as the V2V communication. The communication module 200 may allow vehicles to share platooning information between the vehicles over V2V communication or the like. In other words, for platooning, vehicles which participate in a group should exchange information such as a location, a speed, or the like of another vehicle in the group using the V2V communication. To use such information for autonomous driving, the information should be stably transmitted at a very quick period.

The GPS receiving module 300 may receive GPS information. Thus, the apparatus 100 for controlling platooning of the vehicle may accurately determine a current location of the vehicle based on the GPS information received by the GPS receiving module 300.

The sensing module 400 may include a plurality of sensors for sensing an interval between platooning vehicles in a platooning group, a relative speed between the platooning vehicles, a relative distance between the platooning vehicles, lane information, and an object outside the vehicle. To this end, the sensing module 400 may include an ultrasonic sensor, a radar, a camera, a laser scanner and/or a corner radar, a light detection and range (LiDAR), an acceleration sensor, a yaw rate sensor, a torque sensor and/or a wheel speed sensor, a steering angle sensor, or the like.

The driver switch 500 may be turned on/off by a driver to select a platooning request, platooning acceptance, or the like.

The steering controller 600 may be configured to control a steering angle of the vehicle and may include a steering wheel, an actuator interlocked with the steering wheel, and a controller for controlling the actuator.

The braking controller 700 may be configured to control braking of the vehicle and may include a controller for controlling a brake.

The engine controller 800 may be configured to control to drive an engine of the vehicle and may include a controller for controlling a speed of the vehicle.

Figure 4A:
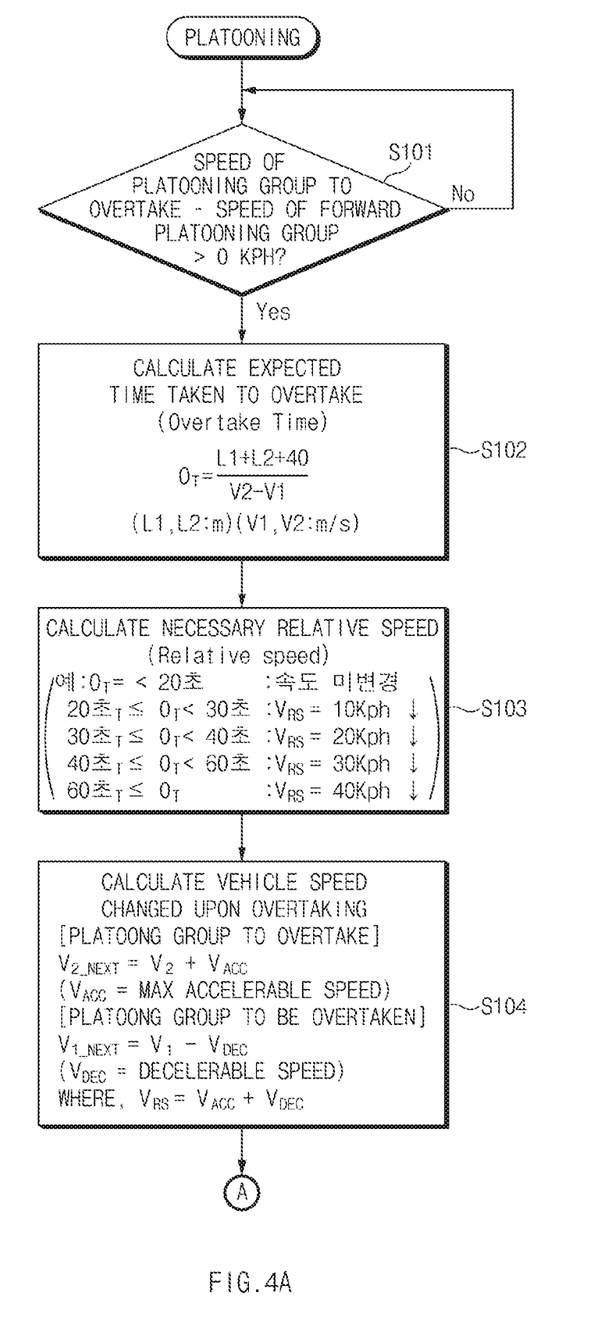
FIGS. 4A, 4B, and 4C are flowcharts illustrating a method for controlling platooning of a vehicle according to an embodiment of the present disclosure.
Figure 4B:
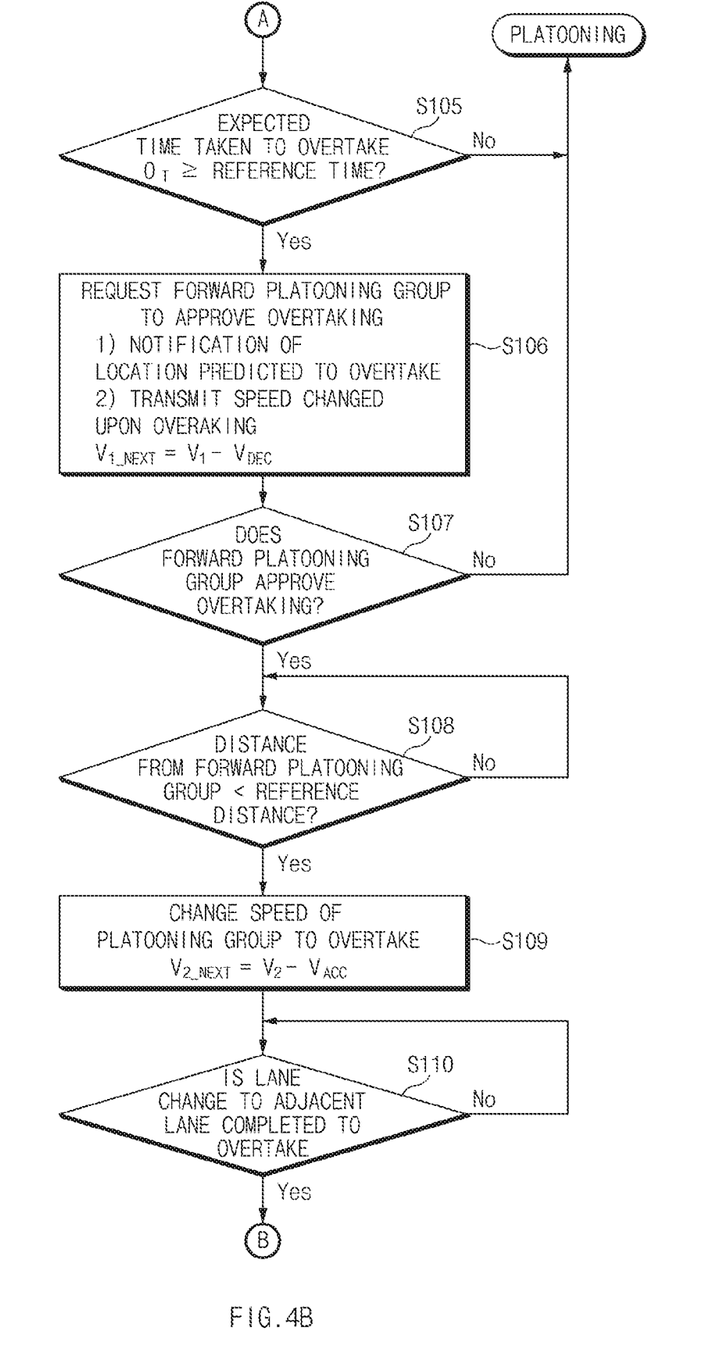
Figure 4C:
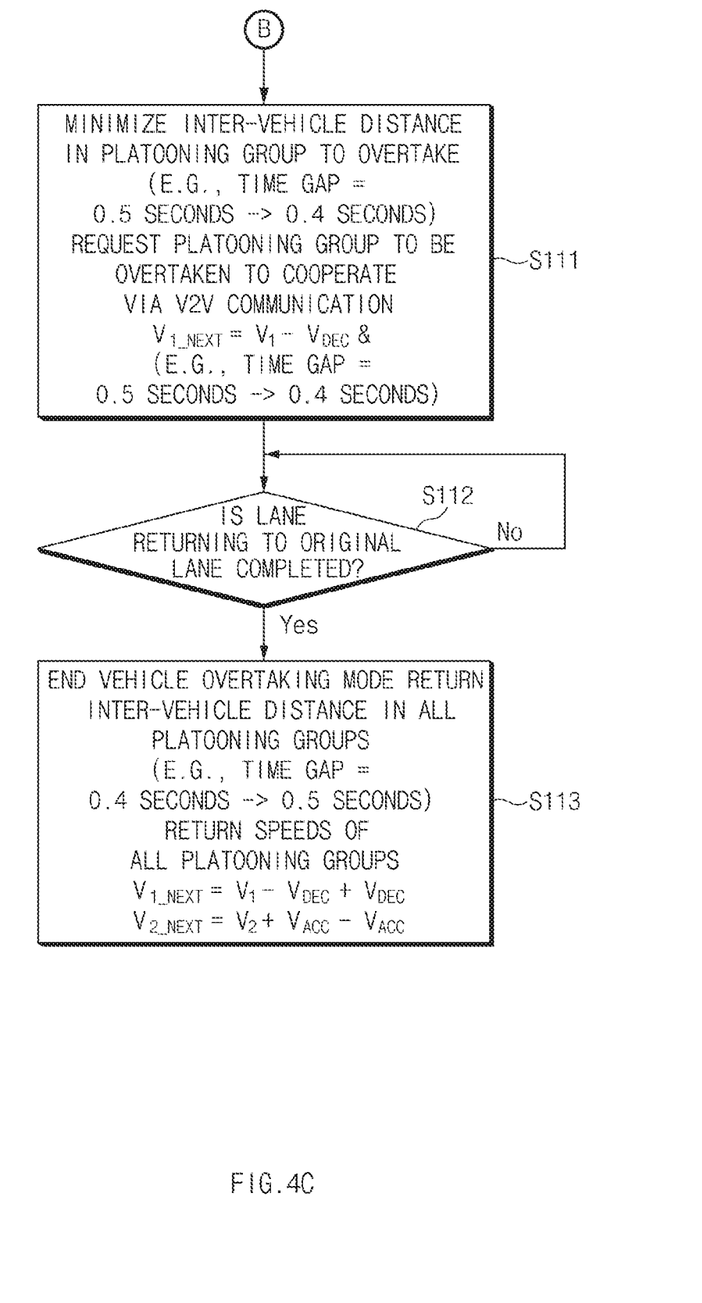

Hereinafter, a description will be given in detail of a method for controlling platooning of a vehicle according to an embodiment of the present disclosure. FIGS. 4A to 4C are flowcharts illustrating a method for controlling platooning of a vehicle according to an embodiment of the present disclosure.

Hereinafter, it is assumed that an apparatus 100 for controlling platooning of a vehicle in FIG. 1 performs a process of FIGS. 4A to 4C. Furthermore, in a description of FIGS. 4A to 4C, an operation described as being performed by an apparatus may be understood as being controlled by a processor 140 of the apparatus 100 for controlling platooning of the vehicle included in a platooning group G1 to overtake (a following platooning group).

Referring to FIG. 4A, in operation Sun, the apparatus 100 for controlling platooning of the vehicle may determine whether a platooning group G2 to overtake is faster in speed than a forward platooning group G1 (a platooning group to be overtaken) during platooning. When the platooning group G2 to overtake is faster in speed than the forward platooning group G1, in operation S102, the apparatus 100 for controlling platooning of the vehicle may calculate an expected time OT taken to overtake, which is a time taken for the platooning group G2 to overtake to overtake the platooning group G1 to be overtaken. In this case, the expected time OT taken to overtake may be calculated as Equation 1 above.

In operation S103, the apparatus 100 for controlling platooning of the vehicle may calculate a relative speed VRS necessary to overtake. For example, when the expected time OT taken to overtake is less than 20 seconds, the apparatus 100 for controlling platooning of the vehicle may fail to change a speed of the vehicle. When the expected time OT taken to overtake is greater than or equal to 20 seconds and is less than 30 seconds, the apparatus 100 for controlling platooning of the vehicle may set the relative speed VRS to 10 Kph or less. When the expected time OT taken to overtake is greater than or equal to 30 seconds and is less than 40 seconds, the apparatus 100 for controlling platooning of the vehicle may set the relative speed VRS to 20 Kph or less. When the expected time OT taken to overtake is greater than or equal to 40 seconds and is less than 60 seconds, the apparatus 100 for controlling platooning of the vehicle may set the relative speed VRS to 30 Kph or less. When the expected time OT taken to overtake is greater than 60 seconds, the apparatus 100 for controlling platooning of the vehicle may set the relative speed VRS to 40 Kph or less.

In operation S104, the apparatus 100 for controlling platooning of the vehicle may calculate vehicle speeds V2_NEXT and V1_NEXT changed upon overtaking. In this case, the changed vehicle speeds V2_NEXT and V1_NEXT may be calculated as Equation 2 above.

Referring to FIG. 4B, in operation S105, the apparatus 100 for controlling platooning of the vehicle may recalculate an expected time OT taken to overtake, based on the vehicle speeds V2_NEXT and V1_NEXT changed upon overtaking. When the expected time OT taken to overtake is greater than or equal to a reference time (e.g., 20 seconds), in operation S106, the apparatus 100 for controlling platooning of the vehicle may request the platooning group G1 to be overtaken (the forward platooning group) to approve overtaking. In this case, the apparatus 100 for controlling platooning of the vehicle may share information about a location predicted to overtake or information about a speed changed upon overtaking with the platooning group G1 to be overtaken (the forward platooning group).

When receiving the approval to overtake from the platooning group G1 to be overtaken (the forward platooning group) in operation S107, in operation S108, the apparatus 100 for controlling platooning of the vehicle may determine whether a distance between the platooning group G2 to overtake and the platooning group G1 to be overtaken (the forward platooning group) is less than a predetermined reference distance (e.g., 300 m). For example, the apparatus 100 for controlling platooning of the vehicle may check whether the distance between the platooning group G2 to overtake and the platooning group G1 to be overtaken (the forward platooning group) is less than 300 m.

When the distance between the platooning group G2 to overtake and the platooning group G1 to be overtaken (the forward platooning group) is less than the predetermined reference distance, in operation S109, the apparatus 100 for controlling platooning of the vehicle may change the speed V2_NEXT of the platooning group G2 to overtake. In other words, the apparatus 100 for controlling platooning of the vehicle may fail to change the speed of the platooning group G2 to overtake until the platooning group G2 to overtake is close to the platooning group G1 to be overtaken to minimize a time for adjusting the speed of the platooning group G1 to be overtaken.

In operation S110, the apparatus 100 for controlling platooning of the vehicle may perform a lane change to an adjacent lane to overtake at the changed speed N2_ NEXT and may determine whether the lane change is completed.

Referring to FIG. 4C, after the lane change is completed, in operation S111, as shown in FIG. 3, the apparatus 100 for controlling platooning of the vehicle may minimize an inter-vehicle distance in the platooning group G2 to overtake and may request the platooning group G1 to be overtaken to cooperate. For example, the apparatus 100 for controlling platooning of the vehicle may decrease a time gap from 0.5 seconds to 0.4 seconds to minimize the inter-vehicle distance in the platooning group G2. Furthermore, the apparatus 100 for controlling platooning of the vehicle may transmit information about the changed vehicle speed V1_NEXT and the changed time gap (e.g., from 0.5 seconds to 0.4 seconds) to the platooning group G1 to be overtaken to request the platooning group G1 to cooperate.

In operation S112, the apparatus 100 for controlling platooning of the vehicle may perform lane returning to the original lane. In operation S113, the apparatus 100 for controlling platooning of the vehicle may end the vehicle overtaking mode. In this case, the apparatus 100 for controlling platooning of the vehicle may return the inter-vehicle distance in both the platooning group G1 to be overtaken and the platooning group G2 to overtake (return the time gap from 0.4 seconds to 0.5 seconds) and may return the vehicle speeds V1_NEXT and V2_NEXT to the original vehicle speeds V1 and V2.

As such, an embodiment of the prevent disclosure may prevent unnecessary traffic congestion by previously determining an expected time taken to overtake between platooning groups such that the platooning groups cooperate with each other on a suitable inter-vehicle distance and speed therebetween using V2V communication and minimizing a time taken to overtake between the platooning groups.

Figure 5:
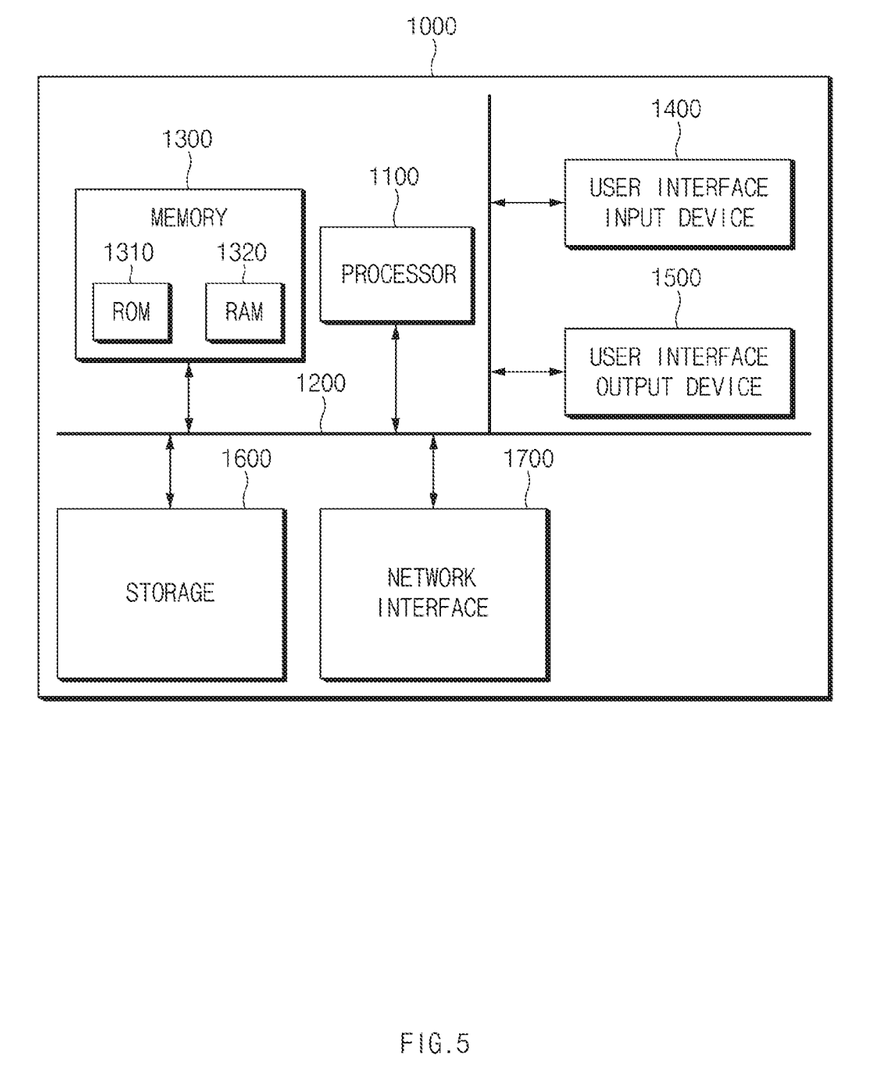
FIG. 5 is a block diagram illustrating a configuration of a computing system according to an embodiment of the present disclosure.

FIG. 5 is a block diagram illustrating a configuration of a computing system according to an embodiment of the present disclosure.

Referring to FIG. 5, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with the embodiments disclosed in the specification may be directly implemented with a hardware module, a software module, or combinations thereof, executed by the processor 1100. The software module may reside on a storage medium (e.g., the memory 1300 and/or the storage 1600) such as a RAM, a flash memory, a ROM, an erasable and programmable ROM (EPROM), an electrically EPROM (EEPROM), a register, a hard disc, a removable disc, or a compact disc-ROM (CD-ROM). An exemplary storage medium may be coupled to the processor 1100.

The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as a separate component of the user terminal.

The present technology may minimize a time taken to overtake by temporary adjusting a platooning line speed and an inter-vehicle distance when vehicle overtaking occurs between platoon lines.

In addition, various effects directly or indirectly ascertained through the present disclosure may be provided.

Hereinabove, although the present disclosure has been described with reference to exemplary embodiments and the accompanying drawings, the present disclosure is not limited thereto, but may be various modified and altered by those skilled in the art to which the present disclosure pertains without departing from the spirit and scope of the present disclosure claimed in the following claims.

What is claimed is:

1. An apparatus for controlling groups of platooning vehicles, the apparatus comprising:
    a processor configured to share platoon line information between a forward platooning group and a rearward platooning group, to determine whether the forward platooning group is to be overtaken by the rearward group, to share vehicle speeds of the forward platooning group and the rearward platooning group, to calculate an expected time taken to overtake, and to control the rearward platoon group to overtake the forward platoon group without changing speeds of the forward platooning group or the rearward platooning group when the expected time taken to overtake is less than a predetermined time; and
    a storage storing the platoon line information.

2. The apparatus of claim 1, wherein the processor is configured to determine that the forward platoon group is to be overtaken when the forward platooning group travels in the same lane and is slower in speed than the rearward platooning group.

3. The apparatus of claim 1, wherein the processor is configured to calculate the expected time taken to overtake based on a platoon line distance of the forward platooning group, a platoon line distance of the rearward platooning group, a platooning speed of the forward platooning group, and a platooning speed of the rearward platooning group.

4. The apparatus of claim 1, wherein the processor is configured to calculate a relative speed necessary to overtake when the expected time taken to overtake is more than the predetermined time, wherein the relative speed necessary to overtake is the sum of a change in speed of the rearward platooning group after acceleration and a change in speed of the forward platooning group after deceleration.

5. The apparatus of claim 4, wherein the processor is configured to calculate a changed speed of the forward platooning group using a current speed and a deceleration amount of the forward platooning group.

6. The apparatus of claim 5, wherein the processor is configured to calculate the changed speed of the forward platooning group so that the sum of the change in speed of the forward platooning group after deceleration and a a change in speed of the rearward platooning group to a maximum speed is the same as the relative speed necessary to overtake.

7. The apparatus of claim 5, wherein the processor is configured to calculate a changed speed of the rearward platooning group based on a current speed and an acceleration amount of the rearward the platooning group.

8. The apparatus of claim 7, wherein the processor is configured to:
    request the forward platooning group to adjust a speed of the forward platooning group to the changed speed after the rearward platooning performs a lane change to an adjacent lane for overtaking; and
    request the forward platooning group to reduce a distance between vehicles of the forward platooning group and request the rearward platooning group to reduce a distance between vehicles of the rearward platooning group.

9. The apparatus of claim 8, wherein the processor is configured to perform return control so that the rearward platooning group returns from the adjacent lane to a previous lane where the forward platooning group is traveling.

10. The apparatus of claim 9, wherein the processor is configured to:
    end a vehicle overtaking mode after the return control; and
    set the distance between the vehicles of the forward platooning group and the vehicles of the rearward platooning group and speeds of the forward platooning group and the rearward platooning group to overtake to previous values.

11. The apparatus of claim 7, wherein the processor is configured to recalculate an expected time taken to overtake, based on the changed speed changed of the forward platooning group and a changed speed of the rearward platooning group.

12. The apparatus of claim 11, wherein the processor is configured to request the forward platooning group to approve overtaking when the recalculated expected time taken to overtake is less than or equal to the predetermined time.

13. The apparatus of claim 12, wherein the processor is configured to share information about a location predicted to overtake and information about a speed changed when overtaking the forward platooning group with the forward platooning group when requesting the forward platooning group to approve the overtaking.

14. The apparatus of claim 12, wherein the processor is configured to determine whether a distance between the forward platooning group and the rearward platooning group is less than a predetermined distance, when receiving an approval to overtake from the forward platooning group.

15. The apparatus of claim 14, wherein the processor is configured to change a vehicle speed of the rearward platooning group to the changed speed of the rearward platooning group, when the distance between the forward platooning group and the rearward platooning group is less than the predetermined distance.

16. A vehicle system, comprising:
    an apparatus for controlling groups of platooning vehicles, the apparatus configured to share platoon line information between a forward platoon group of vehicles and a rearward platooning group of vehicles to share current vehicle speeds of the forward platooning group and the rearward platooning group, to determine whether the forward platooning group is to be overtaken, to calculate an expected time taken for the rearward platooning group to overtake the forward platooning group, and to control the rearward platooning group to overtake the forward platooning group without changing speeds of either platooning group when the expected time taken to overtake is less than a predetermined; and
a communication module configured to perform vehicle-to-vehicle (V2V) communication between the platooning groups.

17. A method for controlling groups of platooning vehicles, the method comprising:
sharing platoon line information between a forward platooning group and a rearward platooning group;
determining that the forward platooning group is to be overtaken by the rearward platooning group;
calculating an expected time for the rearward platooning group to overtake the forward platooning group based on speeds of the forward platooning group and the rearward platooning group; and
determining that the expected time to overtake is less than a predetermined time; and
controlling the rearward platooning group to overtake the forward platooning group without changing speeds of either the forward platooning group or the rearward platooning group based on the determination that the expected time to overtake is less than the predetermined time.

18. The method of claim 17, wherein calculating the expected time taken to overtake comprises calculating the expected time taken to overtake based on a platoon line distance of the forward platooning group, a platoon line distance of the rearward platooning group, a platooning speed of the forward platooning group, and a platooning speed of the rearward platooning group.

19. The method of claim 17, wherein determining that the forward platooning group is to be overtaken by the rearward platooning group comprises determining that the forward platooning group travels in the same lane and is slower in speed than the rearward platooning group.

20. The method of claim 17, wherein the forward platooning group provides permission to overtake prior to controlling the rearward platooning group to overtake the forward platooning group.

* * * * *

UNITED STATES PATENT AND TRADEMARK OFFICE
CERTIFICATE OF CORRECTION

| | | |
|---|---|---|
| PATENT NO. | : 11,449,075 B2 | Page 1 of 1 |
| APPLICATION NO. | : 16/374101 | |
| DATED | : September 20, 2022 | |
| INVENTOR(S) | : Dong Hyuk Kim | |

It is certified that error appears in the above-identified patent and that said Letters Patent is hereby corrected as shown below:

In the Claims

Claim 16, Column 13, Line 3; insert --time-- between "predetermined" and ";".

Signed and Sealed this
Twenty-second Day of November, 2022

*Katherine Kelly Vidal*

Katherine Kelly Vidal
*Director of the United States Patent and Trademark Office*